Oct. 30, 1945.　　　M. L. DEVOL　　　2,387,886
FORMING GLASS SHEETS
Filed Jan. 22, 1943　　　2 Sheets-Sheet 1

Inventor
MANSON L. DEVOL

By Olen E. Bee
Attorney

Oct. 30, 1945. M. L. DEVOL 2,387,886
FORMING GLASS SHEETS
Filed Jan. 22, 1943 2 Sheets-Sheet 2

Inventor
MANSON L. DEVOL
By Olen E. Bee
Attorney

Patented Oct. 30, 1945

2,387,886

UNITED STATES PATENT OFFICE 2,387,886

FORMING GLASS SHEETS

Manson L. Devol, Wilkinsburg, Pa., assignor to Pittsburgh Plate Glass Company, Allegheny County, Pa., a corporation of Pennsylvania Application January 22, 1943, Serial No. 473,191

2 Claims. (Cl. 49—83.1)

The present invention relates to the forming and shaping of glass sheets from molten glass and it has particular relation to the formation and shaping of such sheet by means of roller.

One object of the invention is to provide a method of sizing and shaping glass sheets in a rolling operation, whereby dimensions and shapes can be maintained with greater accuracy than is possible in conventional processes.

A second object is reduced wear upon the surface of rollers employed in the formation of glass sheets.

A third object is to obtain glass sheets which are accurately shaped and formed and which have relatively smooth surfaces.

These and other objects of the invention will be apparent from consideration of the following specification and the appended claims.

In the formation of sheet glass it is customary to pass molten glass from a pot or tank between suitably spaced revolving rollers designed to press the molten material out into a sheet of desired thickness. Subsequently the sheet is allowed to harden and is then annealed. In such process the rollers employed are in direct contact with the glass and are driven at a peripheral speed approximately corresponding to that of the glass sheet, which is formed by the rolling operation. The process is not entirely satisfactory because uniformity is difficult to obtain. This may be due in part to warpage of the rollers, due to local overheating. The molten glass is also relatively corrosive and tends to produce etching of the rollers so that in time the latter become worn and more or less distorted, thus producing further irregularities in the surface of the glass sheet. It is manifest that where the glass is to be ground and polished the various irregularities greatly increase the amount of glass which it is necessary to remove, in order to obtain a smooth sheet of uniform thickness.

In accordance with the provisions of the present invention it is proposed to overcome the foregoing difficulties by rolling molten glass into sheet form between rollers at least one of which is driven at such speed that it tends to retain a thin film of closely clinging air upon the surface thereof. This film provides a cushioning layer preventing direct contact between the molten glass and the metal of the rollers. In this way friction between the glass and the roller is obviated and the transfer of heat to the rollers is greatly reduced.

For a better understanding of the invention reference may now be had to the accompanying drawings in which like numerals refer to like parts throughout.

Figure 1:
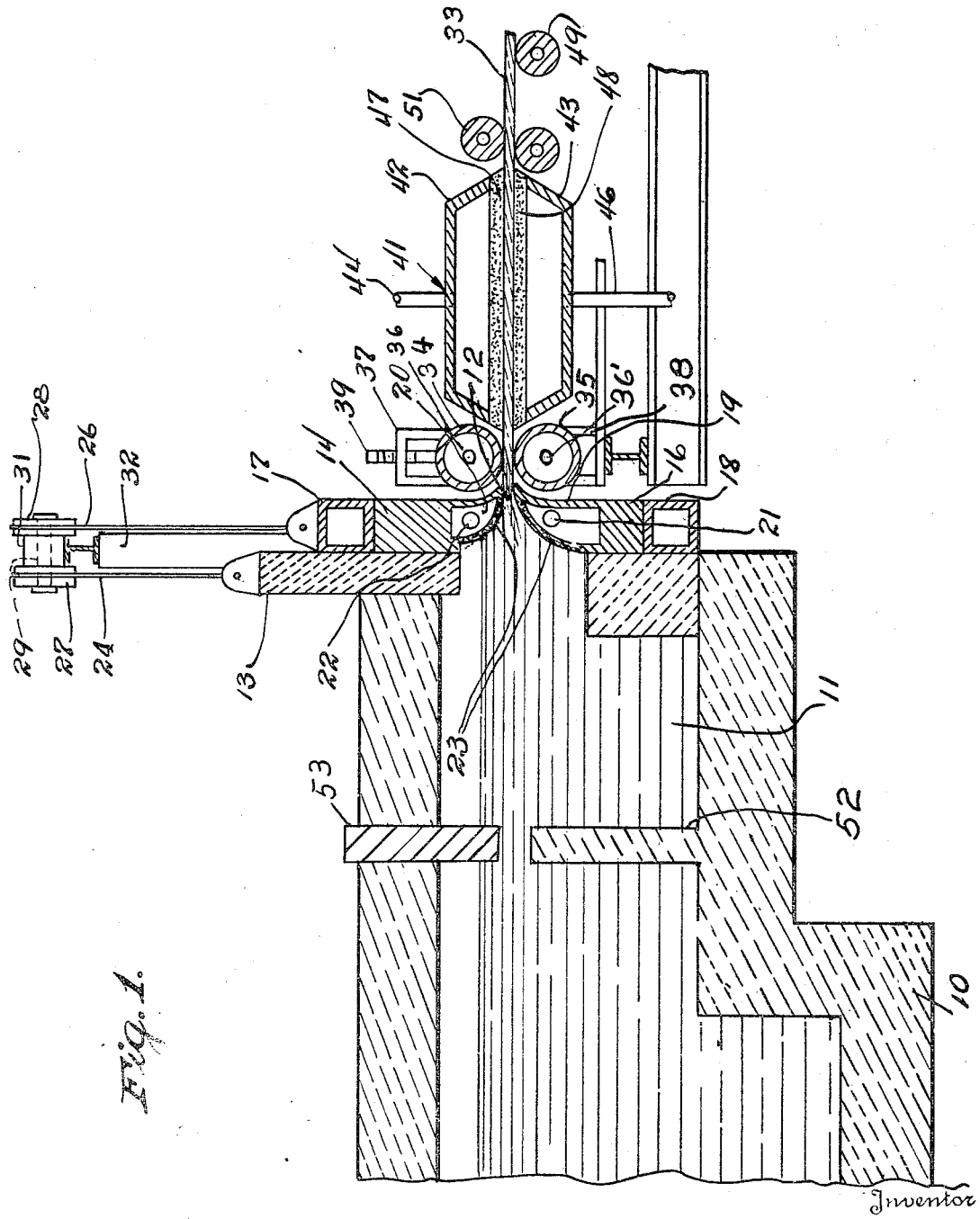
Fig. 1 is a sectional view illustrating in a simplified manner a convenient embodiment of the invention.

The construction of Fig. 1 includes a glass tank 10 which may be of any convenient design and be heated in any convenient manner. The tank is provided with a forehearth 11 having a discharge opening 12 through which molten glass can flow for rolling. A vertically slidable gate 13 is provided for this opening and may be employed to close the opening during periods when glass is not being drawn.

Draw lips 14 and 16 of refractory material are supported above and below the opening upon tubular bars 17 and 18. These bars may be supplied with cooling fluid if so desired. One of the lips, e. g., the upper one 14, is disposed for vertical adjustment in order to admit of regulation of the thickness of the stream of glass passing therebetween. If desired the lips may be formed with chambers 19 and 20 to which gas under slight pressure may be supplied by means of conduits 21 and 22. Obviously the conduit to the slidable lip should be of flexible material or have a flexible connection. The surfaces of the lips contacting with the molten glass are formed of a porous material, such as suitably configured plates 23 of granular silica, pressed powdered metal, carborundum or the like, which will withstand the high temperatures and corrosive action of any glass contacting with them. The graunlar nature of the plates provides a myriad of tortuous channels through which the gases in the chambers 19 and 20 can slowly flow. The pressure within the chambers is so regulated that uniform films of relatively quiescent gas are maintained upon the outer surfaces of the lips over which the glass flows and without substantial contact between the glass and the lips.

Vertically adjustable gate 13 and lip 14 are supported by cables 24 and 26 turned about pulleys 27 and 28. The pulleys are journaled upon shaft 29 extending through a block 31 upon a support 32 extending upwardly above the tank 10. The ends of the cables are attached to any convenient take-up devices, such as counterweights or winding drums (not shown).

The sizing of the glass sheet 33, after it has passed from between the lips 14 and 16, is performed by a pair of spaced rollers 34 and 35 disposed in close proximity to the lips and being provided with drive means. These rollers may be tubular and have coaxial passages 36 and 36' in the ends thereof for circulation of a cooling fluid. The rollers are journaled in bearings 37 and 38, at least one of which is provided with a conventional adjustment screw 39 by means of which the spacing of the rollers may be varied at will.

It will be apparent that the two rollers may be driven simultaneously at relatively high speed to entrain adherent films of air upon the surfaces of both of them. However, if desired, only one of the rollers, namely the upper one may be driven at such speed. The remaining roller, e. g. the lower one, may be driven at approximately the same speed as that of travel of the glass sheet, which is passing therebetween, e. g., 40 to 140 inches per minute. The rate of rotation required for the rollers will vary with the diameter of the rollers, but in general will be such that the rapidly spinning roller carrying the film of air will have a peripheral speed of from 800 to about 6000 inches per minute. Since a roller carrying a film of air is practically frictionless with respect to the glass sheet, it may be driven either forward or backward without substantial effect upon the rate of draw of the sheet. The film of air upon the roller, as previously stated, prevents contact between the glass and surface of the roller, thus reducing the heat transfer and preventing distortion of the rollers and the glass. However, the sheet of glass is sized or formed between the rollers with a high degree of accuracy.

In order to prevent sagging with resultant waviness or distortion of the plane of the glass while the sheet is still soft and flexible after leaving the rollers a supporting device 41 may be provided. This includes upper and lower chambers 42 and 43, which may be supplied with gas, such as air, under slight compression by means of conduits 44 and 46. The gases may be relatively cold in order to assist rapid cooling of the sheet 33. The chambers are provided with porous plates 47 and 48 of a texture corresponding to that of the members 23. The gas flows through these porous members in such manner as to provide non-friction films of quiescent gas upon the surfaces of the plates that support the glass without any physical contact with the solid surfaces. The glass sheet 33 may thus be maintained in a perfectly flat state and without substantial pull or drag thereupon until it has become sufficiently hardened to withstand such contacts and forces without distortion.

The hardened sheet is carried away by means of driven rollers 49 providing a conveyor of any desired length. The sheet may thus be conducted through a suitable annealing lehr (not shown). An upper roller 51 may also be provided in order to assist in pulling the glass sheet away from the forming rollers. However, obviously the tension upon the sheet should be very slight, in order to prevent an excessive tendency to stretch it. The flow of the sheet through the lips 14 and 16 may be promoted by maintaining a slight head of glass above the discharge opening 12 in such manner as to force the molten glass out by slight hydraulic pressure.

In order to regulate the head of glass back of the rollers 34 and 35, a dam 52 is disposed in the forehearth 11 and terminates somewhat below the normal surface level of the glass pool. Above this dam is disposed a slide 53 of refractory material which may be raised or lowered to control the amount of glass flowing to the forehearth and thus to control the head of glass back of the rollers.

Figure 3:
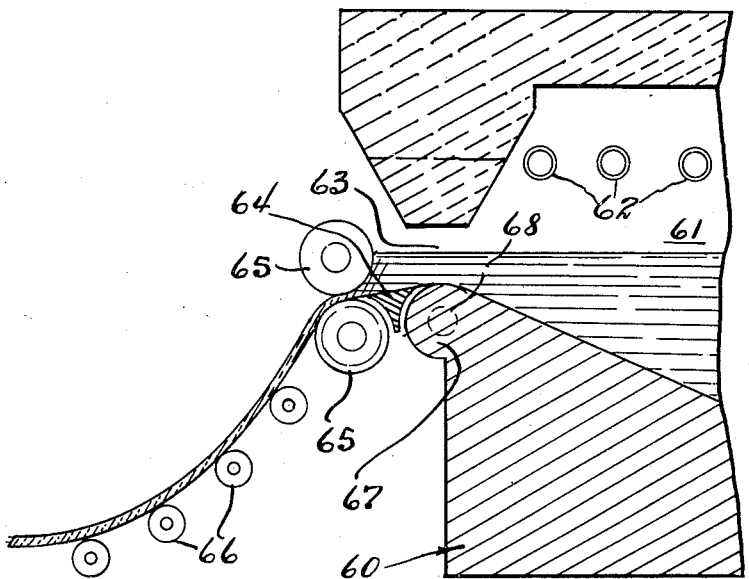
Fig. 3 is a fragmentary sectional view of the furnace employed with the apparatus shown in Fig. 2.
Figure 2:
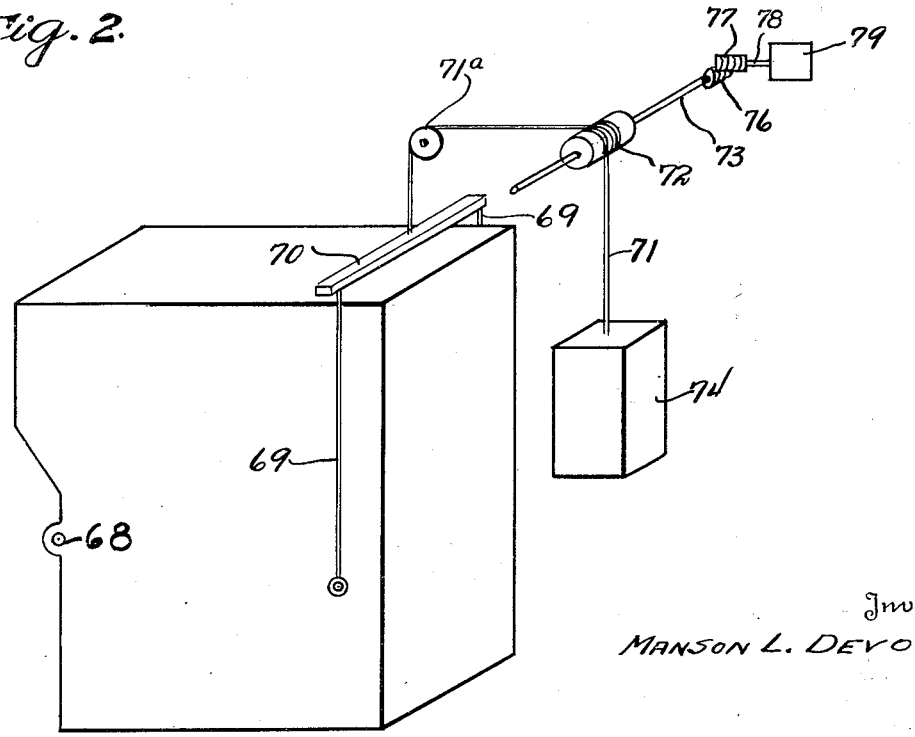
Fig. 2 is an isometric view of the second form of the invention.

In Figures 2 and 3 is disclosed a tiltable furnace which can be adjusted to control the rate of flow of glass to the rollers. This construction embodies a furnace body 60 of refractory material having a chamber 61 for molten glass, with heating elements 62 disposed in the chamber. The glass discharges through opening 63, and over apron 64, to rollers 65, corresponding substantially to rollers 34 and 36. The sheet is carried away upon rollers 66. Lip portion 67 of the furnace is provided with horizontal trunnions 68 upon which the furnace can be tilted to regulate the rate of flow of the glass. The furnace is tilted by means of cables 69, attached to a cross-bar 70, which bar is further attached to a cable 71. The latter is trained over a pulley 71a and about a drum 72 upon a shaft 73 and is provided at its extremity with a counterweight 74. Shaft 73 is activated by worm 76 engaging worm drive 77 upon shaft 78 of electrical motor 79. By activating the motor, the furnace may be tilted to control the flow of glass from the chamber 61.

What I claim is:

1. A process of forming accurately sized, relatively smooth sheets of glass which process comprises drawing out a sheet of molten glass and while it is being so drawn passing it between a pair of spaced sizing rollers at least one of the rollers being rotated at a speed above 800 inches per minute whereby to carry clinging films of air upon the roller surfaces between the surface of the rollers and the contiguous surfaces of the glass sufficient to support the glass without physical contact between the surfaces of the rollers and the surfaces of the glass.

2. A process of forming accurately sized, relatively smooth sheets of glass which process comprises drawing out glass in a molten state as a sheet, sizing the sheet while it is being so drawn by means of a pair of opposed spinning rollers appropriately spaced with respect to each other and being disposed upon opposite sides of the sheet of glass, obviating contact between the surfaces of the glass and the surfaces of the rollers by spinning the rollers at a speed approximately within the range of 800 to 6000 inches per minute, the speed being sufficient to carry films of air between the rollers and the glass thus preventing actual physical contact between the glass and the rollers and subsequently cooling and annealing the glass.

MANSON L. DEVOL.